Feb. 24, 1953   A. H. NOLDE ET AL   2,629,269
GROOVING TOOL
Filed Sept. 3, 1948

INVENTOR.
A. H. NOLDE
BY A. D. GUAGLIARDO
ATTORNEY.

Patented Feb. 24, 1953

2,629,269

UNITED STATES PATENT OFFICE 2,629,269

GROOVING TOOL

Arthur H. Nolde and Anthony D. Guagliardo, Wauwatosa, Wis., assignors to The Falk Corporation, Milwaukee, Wis., a corporation of Wisconsin Application September 3, 1948, Serial No. 47,686

2 Claims. (Cl. 77—57)

The present invention relates generally to improvements in tools for forming internal grooves in bodies, and relates more specifically to improvements in the construction and operation of tool assemblages for cutting annular recesses or grooves within the bores of diverse articles.

The primary object of our invention is to provide an improved grooving tool assembly which is simple and compact in construction, and which is also highly efficient in operation.

Another object of this invention is to provide an improved boring bar fixture adapted to automatically and rapidly cut annular recesses of predetermined depth within the bores of various kinds of work.

A further object of the invention is to provide an improved mechanism for gradually and effectively feeding the cutter of a boring bar outwardly away from and inwardly toward the bar axis.

Still another object of our invention is to provide an improved cutting tool holder and feeding device for boring bar assemblages, which is durable in construction and dependable in operation.

An additional object of the present invention is to provide a precision grooving tool assembly, which may be conveniently applied to or removed from a boring bar or the like, and all parts of which are well protected against damage while being readily accessible for inspection.

These and other objects of the invention will be apparent from the following detailed description.

A clear conception of the construction and operation of a typical embodiment of our invention, may be had by referring to the drawing accompanying and forming a part of this specification, wherein like reference characters designate the same or similar parts in the various views.

Figure 1:
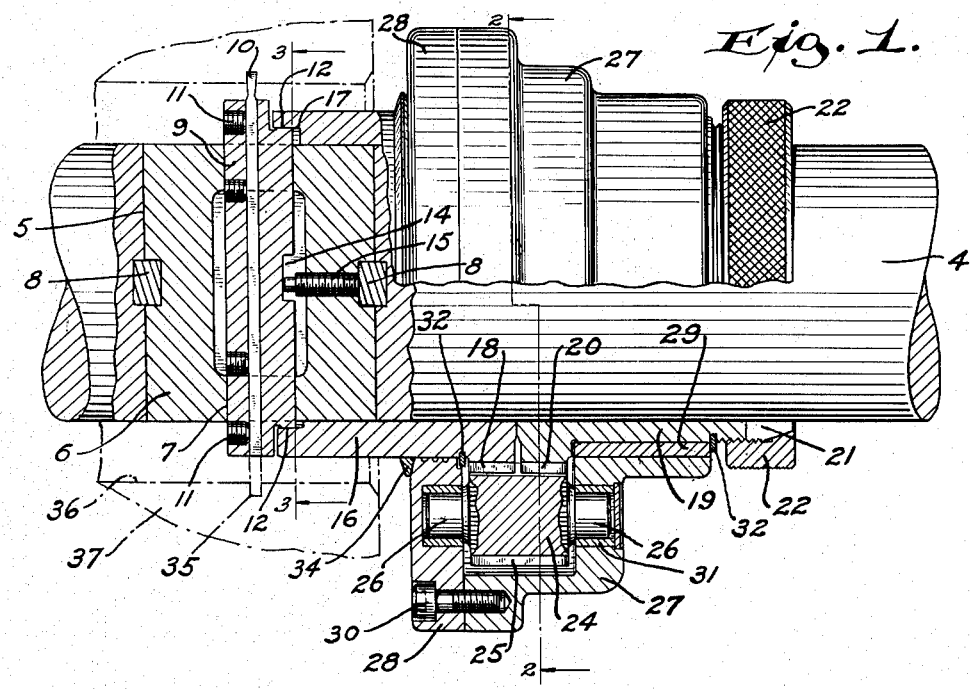
Fig. 1 is a part sectional side elevation of one of the improved grooving tool mechanisms showing the same applied to a fragment of a boring bar, and in the act of cutting an annular groove.
Figures 2, 3:
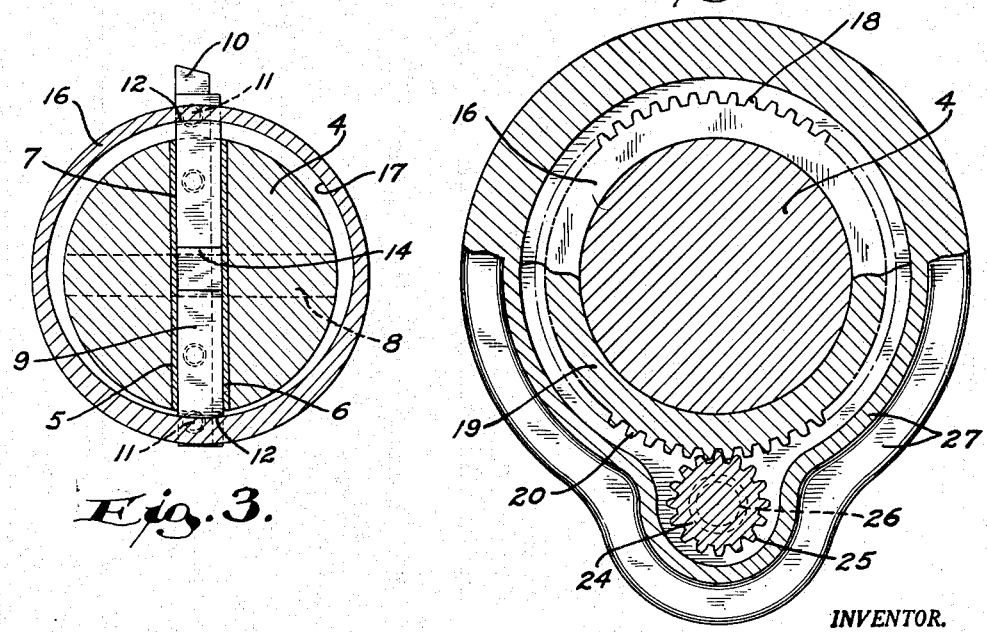
Fig. 2 is a transverse section through the assemblage of Fig. 1, taken along the line 2—2 and viewed in the direction of the arrows.
Fig. 3 is another transverse section through the same assemblage, taken along the irregular line 3—3 and viewed in the direction of the arrows shown in Fig. 1.

While the invention has been shown and described as having been embodied in a typical rotary boring bar assemblage wherein the bar is adapted to revolve a cutter in order to produce an internal groove in the work, it is not our desire or intention to unnecessarily limit the scope or utility of the device by virtue of this restricted embodiment, and it is also contemplated that specific descriptive terms used herein be given the broadest possible interpretation consistent with the disclosure.

Referring to the drawing, the elongated cylindrical boring bar 4 is rotatable about a fixed axis in any convenient and well known manner, and is provided with a local transverse through opening 5 within which a bearing element 6 having a transverse guide slot 7 therein, is fixedly but removably confined as by keys 8. A cutter carrying block 9 to which cutters 10 of any desired length and shape may be secured by means of set screws 11, is snugly but slidably confined within the guide slot 7 of the element 6, and one side of this block 9 is provided with opposite arcuate end abutment surfaces 12, and with a central recess 14 with which a stop screw 15 carried by the element 6 coacts so as to prevent the block 9 from falling out of the slot 7, see Fig. 1.

An annular sleeve or driven member 16 snugly embraces and is journalled for rotation upon the periphery of the bar 4 and has its end adjacent to the cutter 10 provided with an eccentric bore 17 which slidably engages both of the abutment surfaces 12, while its opposite end is provided with an annular set of gear teeth 18. Another annular sleeve or driving member 19 likewise snugly embraces the periphery of the bar 4 coaxially of the member 16, and has its end adjacent to the member 16 provided with an annular set of teeth 20, while its opposite end 21 is slotted, tapered and externally threaded as shown, for the reception of an internally threaded and tapered clamping collar 22 adapted to secure the member 16 to the bar 4 so as to rotate therewith. The number of teeth 20 in the driving member set is slightly greater than the number of teeth 18 in the driven member set, but these teeth 18, 20 are of like formation and have similar characteristics.

A planetary pinion 24 has teeth 25 which coact with the teeth 18, 20 of both annular sets, and this pinion 24 also has integral stub shafts 26 at its opposite ends which are journalled for rotation in separable sections 27, 28 of a housing. The housing section 27 is supported upon the driving member 19 through a bearing sleeve 29, and the two sections 27, 28 are firmly but detachably united by means of screws 30, but the members 16, 19 are freely rotatable within the pinion supporting housing so that the latter may be held stationary whenever desired. The pinion shafts 26 are journalled in alined bearings 31 carried by the housing sections 27, 28 and the housing is fixed against axial shifting relative to the members 19, 16 by means of snap rings 32. The interior of the gear and pinion housing may be filled with grease which is prevented from escaping by a sealing ring 34.

When the improved mechanism has been properly constructed and assembled as above described, it may be utilized to cut annular internal grooves 35 of predetermined depth into the bores 36 of diverse articles or bodies 37 such as shown in dot-and-dash lines in Fig. 1, in the following manner. The cutter 10 carried by the block 9 should first be retracted so as to permit the boring bar 4 and the body 37 to be properly relatively positioned in order to cut the groove 35 at the desired location. The ring 22 should then be rotated so as to firmly clamp the driving member 19 to the bar 4, whereupon rotation of the bar will be imparted to the member 19. If the housing sections 27, 28 are not held and are permitted to revolve with the bar 4 and member 9, the driven member 16 will merely revolve at the same speed as that of the bar 4, so that the block 9 and cutter 10 will not move relative to the rotating bar.

However, when the pinion housing is held stationary, the revolving driving member 19 will rotate the pinion 24 and the revolving teeth 25 thereof will impart differential rotation to the driven member 16 thus causing this member to revolve slowly about the bar 4 and relative to the other member 19. This differential speed is produced by the difference in number of the teeth 18, 20 of the two series and since this difference is slight, amounting to only one or two teeth, the rotation of the member 16 relative to the boring bar 4 will be positive but slow. This relative rotation of the sleeve member 16 will obviously cause the eccentric bore 17 to revolve about the boring bar axis and since this bore 17 constantly snugly engages both of the arcuate abutment surfaces 12 of the block 9, this block together with the tool or cutter 10 will first be moved outwardly to cut the groove 35 and thereafter inwardly to retract the cutter into the bore 36.

In this manner, successive grooves 35 of definite depth and of predetermined shape dependent upon the selected shape of the cutter 10, may be rapidly and automatically produced. The depth of these grooves 35 may be changed by varying the eccentricity of the bore 17, and this bore 17 may be withdrawn from the abutment surfaces 12 of the sliding block 9, by merely releasing the clamping collar 22 and by thereafter sliding the members 16, 19 along the bar 4 away from the block 9. When the block 9 has been thus released from the member 16, the keys 8 may be driven out, whereupon the bearing element 6 may be withdrawn from the opening 5 so as to make the retaining screw 15 accessible. Upon release of the screw 15, the block 9 may be freely withdrawn from the slot 7 thus permitting release of the cutter clamping screws 11 and removal of the cutter 10. The dismantled assemblage may be just as conveniently re-assembled by reversing these operations; and the gearing is also readily accessible by merely releasing the screws 30 which normally unite the housing sections 27, 28.

From the foregoing detailed description it should be apparent that our present invention in fact provides a grooving tool assemblage which besides being simple, compact and durable in construction, is conveniently manipulable and efficient in operation. The improved boring bar fixture may obviously be readily assembled or dismantled, and functions automatically to accurately cut the grooves 35 in rapid succession. The cutter 10 is fed into the work gradually but positively, thus producing smooth cuts and avoiding tearing of the metal, and all parts of the improved assemblage are of sturdy construction and are well protected against possible damage. The various parts of the cutter feeding mechanism may also be readily constructed, and conveniently replaced by modified parts adapted for the performance of different types of grooving.

It should be understood that it is not desired to limit this invention to the exact details of construction or to the precise mode of operation, herein shown and described, for various modifications within the scope of the appended claims may occur to persons skilled in the art.

We claim:

1. An internal grooving tool comprising a supporting bar, a tool carrier transversing said bar and guided therein for feed movement transversely thereof, said carrier having means for supporting a tool in position to project laterally beyond said bar, said carrier also having oppositely directed abutments adjacent opposite ends thereof, a camming device encircling said bar and rotatable relative thereto, said camming device having an eccentric circular cam surface in contact with both of said abutments at diametrically opposite points on said surface so as to positively control the longitudinal position of said carrier relative to said bar, and differential mechanism for controlling relative rotation between said camming device and said bar.

2. An internal grooving tool comprising a supporting bar, a tool carrier transversing said bar and guided therein for feed movement transversely thereof, said carrier having oppositely directed abutments adjacent opposite ends thereof, a camming device encircling said bar and having an eccentric circular cam surface in contact with both of said abutments at diametrically opposite points on said surface so as to positively control the longitudinal position of said carrier relative to said bar, two concentric gears connected to said bar and camming device respectively, a planet member in meshing engagement with both of said gears, and a planet carrier rotatable about said bar for effecting rotation of said camming device relative to said bar.

ARTHUR H. NOLDE.
ANTHONY D. GUAGLIARDO.

REFERENCES CITED

The following references are of record in the file of this patent:

UNITED STATES PATENTS

| Number | Name | Date |
|---|---|---|
| 787,490 | Berszinsky | Apr. 18, 1905 |
| 2,457,040 | Hall | Dec. 21, 1948 |

FOREIGN PATENTS

| Number | Country | Date |
|---|---|---|
| 549,904 | Germany | May 6, 1932 |
| 670,703 | Germany | Jan. 4, 1939 |